INVENTORS:
MARKUS A. EGGENBERGER,
PETER G. IPSEN,
PAUL H. TROUTMAN,

BY *W. C. Crutcher*

THEIR ATTORNEY.

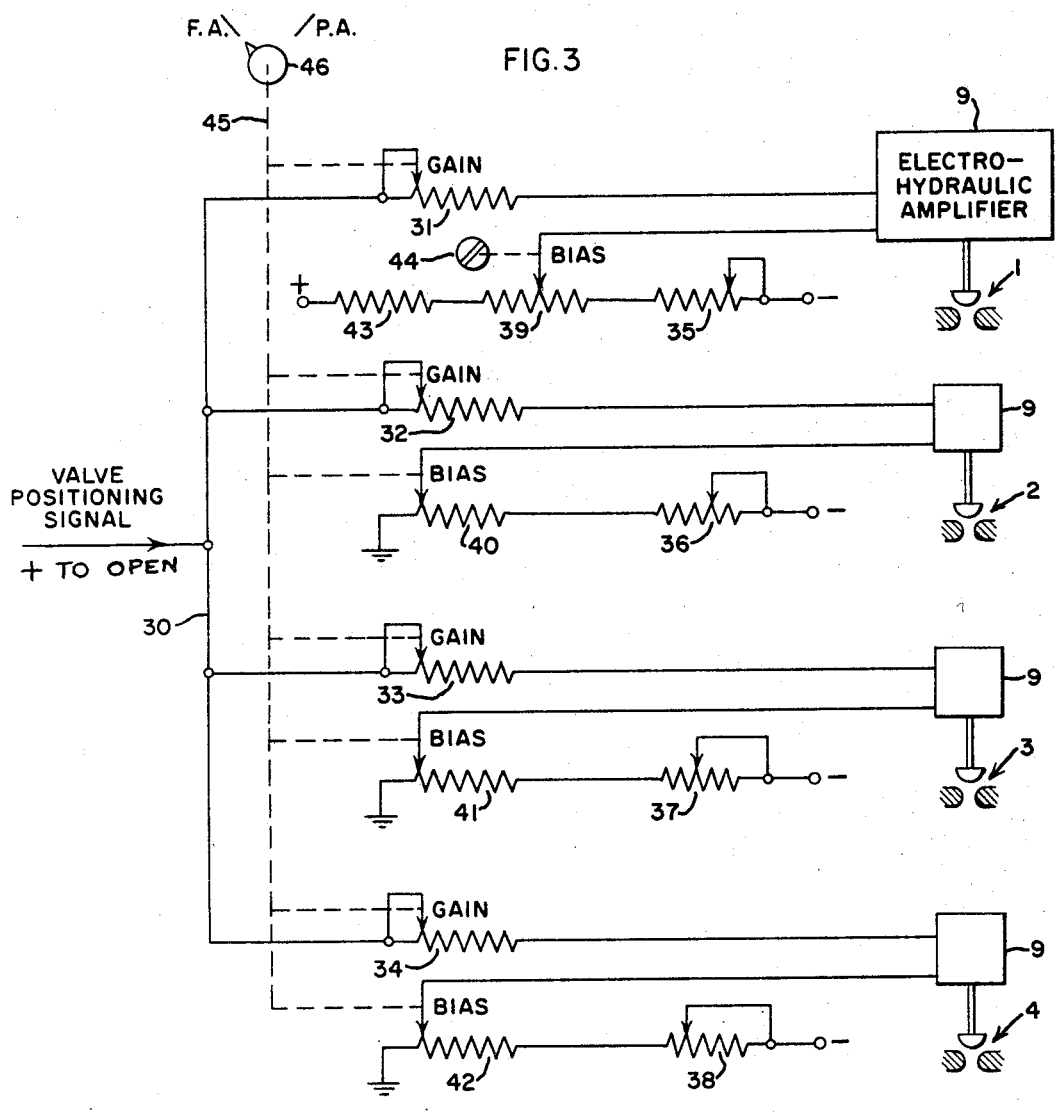

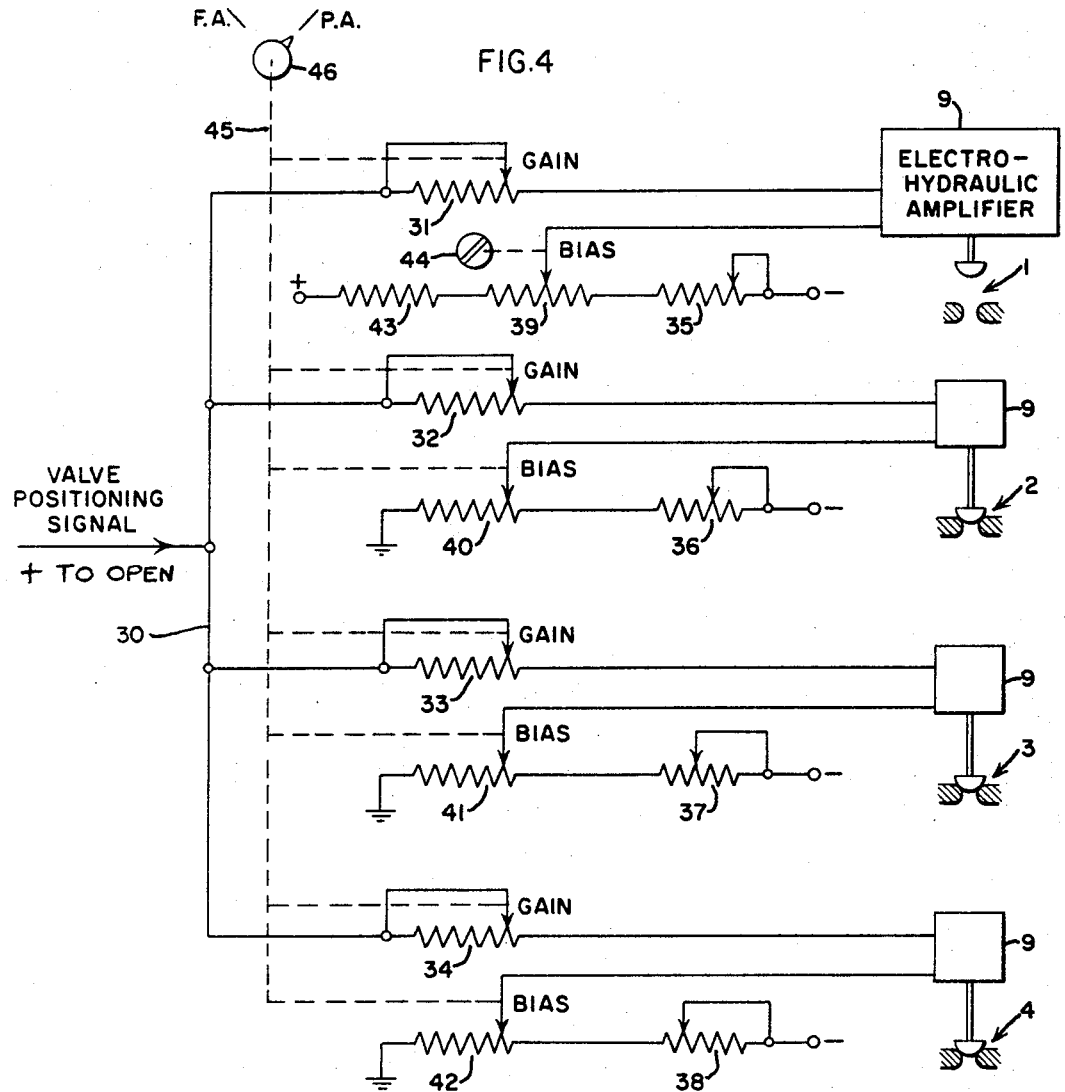

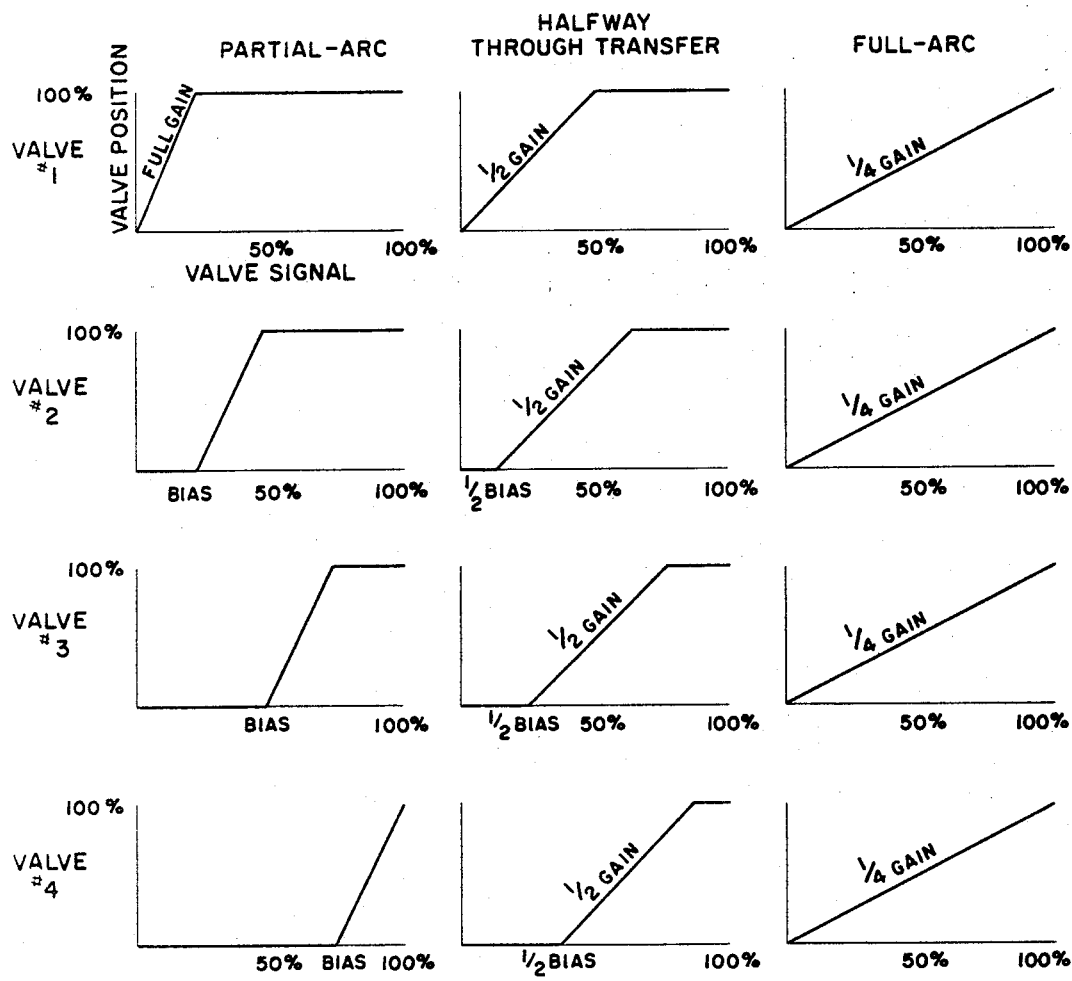

United States Patent Office 3,403,892
Patented Oct. 1, 1968

3,403,892
FULL ARC-PARTIAL ARC TRANSFER SYSTEM FOR ELECTROHYDRAULIC TURBINE CONTROL
Markus A. Eggenberger and Peter G. Ipsen, Schenectady, N.Y., and Paul H. Troutman, Columbus, Ohio, assignors to General Electric Company, a corporation of New York
Filed Jan. 12, 1967, Ser. No. 608,858
5 Claims. (Cl. 253—59)

ABSTRACT OF THE DISCLOSURE

An electrohydraulic control system for controlling steam turbine valves either sequentially during partial-arc operation or in parallel during full-arc operation and transferring between the two types of operation at any load by simultaneously adjusting the gain and bias on individual valve amplifiers.

Background of the invention

This invention relates generally to steam turbine electro-hydraulic control systems of the type where electrohydraulic amplifiers position a number of control valves admitting steam to the turbine in response to electrical valve positioning signals in order to control the speed or load on the turbine. More particularly the invention relates to the transfer back and forth between "full-arc" and "partial-arc" opeartion in a steam turbine.

Partial arc control of the steam flow to the first stage of a steam turbine was devised many years ago and is widely used because it has the advantage of providing a significant improvement in turbine heat rate at partial loads, as contrasted with full arc control. However, the use of partial arc control results in higher thermal stresses in the turbine under most operating transients than would exist if full arc control were used. This arises for two principal reasons. First, in starting a turbine with partial arc control, steam is admitted to only a portion of the circumference of the first stage with the result that the inlet portion of the turbine is heated unevenly and in steps, rather than uniformly. Second, where a turbine is operating under load, the change in temperature in the first stage shell for a given load change is appreciably greater with partial arc control than it is with full arc control.

Thus, it is obvious that the ability to transfer back and forth between partial-arc and full-arc control at any load would afford the opportunity to reduce thermal stresses on the turbine without giving up the efficiency advantages of partial arc control. For example, with such an arrangement, it would be normal practice to start and load under full arc control; then where the desired load was reached, the transfer would be made to partial arc control at a rate which would result in reasonable thermal stresses. For a large reduction in load after sustained operation at a high load, the control would be switched to the full arc made as load was being reduced in order to minimize the change in first stage shell temperature. For cases where the turbine had been operating for some time at light load on partial arc control and a large load increase was scheduled, a transfer to full arc control would be made well ahead of the time of the load increase so as to accomplish a portion of the first stage temperature increase; then the temperature change associated with the load change would be smaller and could be made more rapidly without exceeding allowable thermal stresses.

There exist in the prior art several control systems which provide means to reduce the thermal stresses in steam turbines while still retaining the efficiency advantage of partial arc control.

The control systems described in U.S. Patents 3,027,137 and 3,097,488, assigned to the present assignee provide means to overcome the uneven heating of the inlet portion of the turbine first stage during starting and operation at low load but do not provide means to reduce the severity of thermal stresses during load changes except in a limited range at low load. In addition, the need to transfer control from one valve set to another, a suitable transfer system being described in assignee's U.S. Patent 3,097,489, may introduce a discontinuity in the control.

It has also been suggested in the prior art that the control valves alone can be manipulated in two different manners to obtain either partial arc or full arc operation. However, the total flow rate of steam before and after transfer in the proposed system was substantially different and had to be compensated for by readjusting the turbine load setting during transfer.

Another system using control valves alone to provide partial arc or full arc operation is disclosed in an application Ser. No. 608,857, filed of even date herewith in the names of L. H. Johnson and R. L. Carson. However that system is primarily useful for cam-operated control valves.

One object of the invention is to provide an improved electrohydraulic control system for operating on either full arc or partial arc control and accomplishing the transfer therebetween at any load with only minor load change.

Another object of the invention is to provide an improved control system for coordinating movements of control valves smoothly when transferring between full arc and partial arc operation.

Summary of the invention

Briefly stated, the invention comprises an electrohydraulic control for a number of steam turbine control valves, which simultaneously adjusts the gain and electrical bias for individual valve servos while making the transfer.

Description of the drawing

The subject matter which is regarded as the invention is particularly pointed out and distinctly claimed in the concluding portion of this specification. The invention, however, both as to organization and method of practice, together with further objects and advantgaes thereof, may best be understood by reference to the following description, taken in connection with the accompanying drawing in which:

FIGS. 3 and 4 are partial circuit diagrams of the gain and bias adjusting devices during full arc and partial arc respectively, and FIG. 5 is a series of simplified graphs assuming linear relationships during the transfer and illustrating the principle of the invention.

Description of the preferred embodiment

Figure 1:
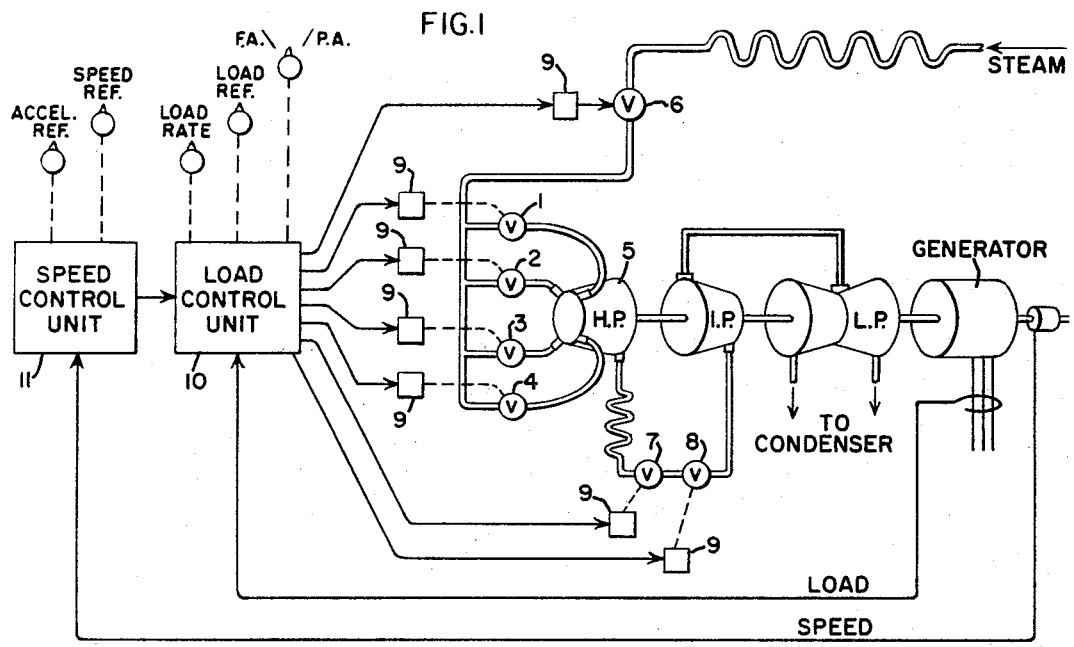
FIG. 1 is a simplified schematic view of a reheat steam turbine and its electrohydraulic control system.

Referring first to FIG. 1 of the drawing, a tandem reheat steam turbine-generator is controlled primarily by admitting steam through control valves 1, 2, 3 and 4. These valves are generally located on or near the high pressure tubing casing 5 so as to direct steam to circumferentially spaced nozzle arcs (not shown) inside the turbine.

There are also additional valves controlling the flow of steam which are not material to the present invention, such as one or more "stop" valves 6, 7 (which are "off-on" type valves) and intercept valves 8 which perform a throttling function over the reheated steam. The valves are all actuated by electrohydraulic amplifiers 9 in response to electrical valve positioning signals from the load control unit 10 and speed control unit 11.

The manner in which the control valve positioning signal is obtained is likewise not material to the present invention, but here it is a DC voltage which is proportional to a desired position of the steam turbine valve from closed to open position. A common valve positioning signal is used to position control valves 1–4. Local control unit 10 and speed control unit 11 furnish the valve positioning signal by measuring quantities such as actual speed, actual load, actual rate of speed change, actual rate of load change and comparing them against desired reference values set with the knobs indicated in FIG. 1. A suitable control system for accomplishing the foregoing is set forth in copending application Ser No. 542,157, now Patent No. 3,340,883 issued Sept. 12, 1967 to Jacob R. Peternel and assigned to the present assignee.

Figure 2:
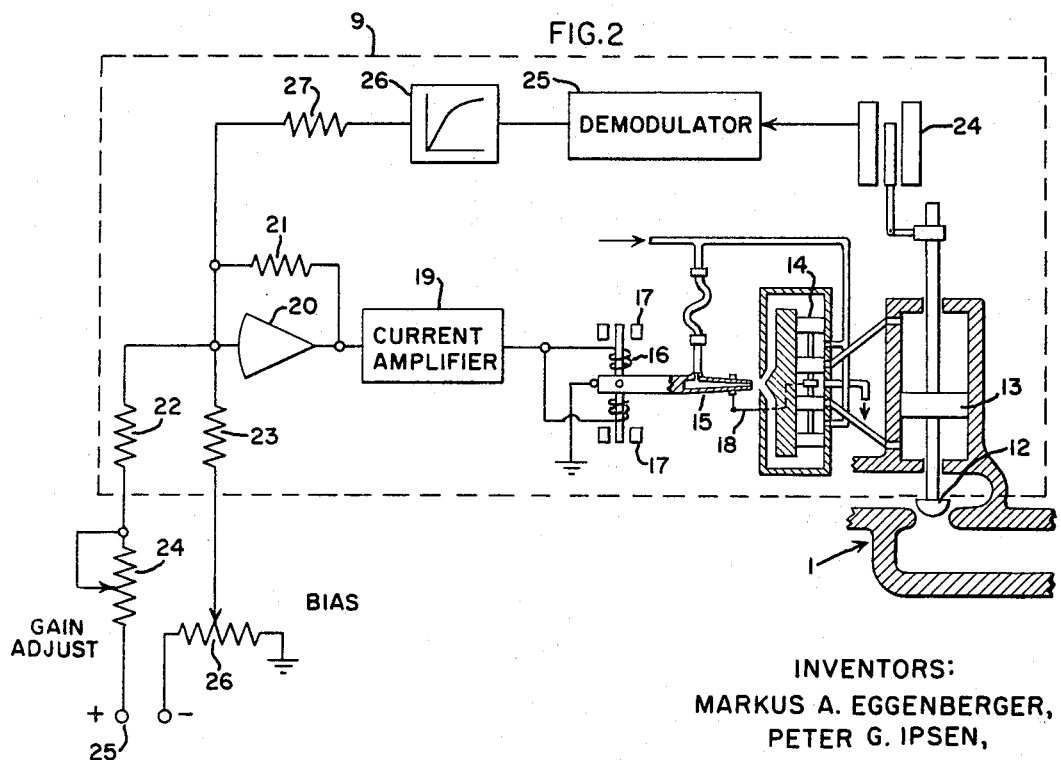
FIG. 2 is a simplified schematic view of an electrohydraulic amplifier suitable for each of the turbine control valves.

Referring now to FIG. 2 of the drawing, a suitable electrohydraulic amplifier 9 for positioning a steam valve is shown within the dotted lines. Each valve such as 1 includes a movable valve disk 12 positioned by a piston 13 in response to movements of a force-balanced pilot valve 14 controlling the flow of high pressure oil. The opposite ends of pilot valve 14 act as pistons with pressures on them determined by the position of a pivotable jet 15. The jet is pivoted by torque coil 16 acting in conjunction with permanent magnet 17 and a restoring force is provided by spring 18. The current for torque coil 16 is provided by a conventional current amplifier 19 in response to the voltage output of a high gain DC operational amplifier 20. A feedback impedance 21 which is shown as a resistor but which could be an RC network to provide the desired transfer function for the total electrohydraulic amplifier is connected to the input of operational amplifier 20. Conventional input impedances 22, 23 are also connected to the input end of operational amplifier 20.

In order to provide a closed loop valve positioning control, the actual valve position is measured by means of a movable core inside a linear variable differential transformer 24 with suitable excitation source (not shown) in order to provide a feedback signal. This signal is demodulated and converted to a DC voltage at 25, and if desired a suitable function generator 26 can be used to compensate for nonlinear variations of steam flow with valve position. This valve position feedback signal is also connected to the summing junction of amplifier 20 through a feedback impedance 27.

The connections in the embodiment shown are such that a positive DC voltage applied at the input end of impedance 22 (or 23) represent a corresponding desired position of valve disk 12. Without a function generator 26, the position would be proportional to the DC valve positioning signal. With the function generator 26, the steam flow through the valve, rather than valve position, will be substantially proportional to voltage. However, this refinement will be ignored in the remainder of the discussion in order to simplify the description.

A variable resistor 24 serves to adjust the gain of the electrohydraulic amplifier 9 for a given valve positioning signal applied at an input terminal 25. An adjustable DC voltage source 26 of opposite polarity to the valve opening signal is used to provide a bias, i.e., a valve closing signal which must be overcome by the valve positioning signal at 25 before the valve can commence to open. The gain adjustment has to do with incremental effect of valve positioning signal on the valve, i.e., the change required in valve positioning voltage to produce a full valve stroke, whereas the bias affects the absolute magnitude of the valve positioning voltage which will commence to open the valve.

Referring to FIGS. 3 and 4 of the drawings, which are the same except for different positions of the gain and bias adjustment for full arc and partial arc, control valves 1, 2, 3, 4 are first shown in partially open position in FIG. 3, it being understood that each of these valves controls flow of steam to a separate nozzle arc. The valves are shown operated by electrohydraulic amplifiers 9 which are the same as the portions 9 enclosed within the dotted lines of FIG. 2.

A common valve positioning singal imposed on input lead 30 in accordance with the dictates of the load control unit is supplied to each electrohydraulic amplifier 9 through "gain-adjusting" resistors 31, 32, 33, 34. FIG. 3 shows the arms of resistors 31–34 in the low gain position (since an increase in input impedance to an operational amplifier will decrease the gain).

A suitable negative voltage source is applied to four adjustable "bias selecting" potentiometers 35, 36, 37, 38 which are set so as to apply progressively more negative voltages to the ends of adjustable voltage dividers 39, 40, 41, 42 for valves 1–4 respectively. Voltage divider 39 for valve 1 is connected at the other end to a suitable positive voltage source through resistor 43, and a screwdriver adjustment 44 thus serves to set a zero reference point for valve 1. The remaining voltage dividers 40–42 are grounded as indicated, or otherwise connected to a common reference voltage level.

In accordance with the present invention, the movable arms of gain-adjusting resistors 31, 32, 33, 34 and the movable arms of the bias-adjusting voltage dividers 40, 41, 42 are all ganged to move as a unit so as to simultaneously adjust the gain and bias on the individual valves, the gain being increased as the respective biases are applied. This ganged interconnection of gain and bias adjusting devices is indicated by the dotted lines 45 connecting the taps to a selector knob 46.

In FIG. 3 where selector knob 46 is shown in the full arc position, the gain resistors 31–34 are in the low gain position, and the bias voltage dividers 39–42 are all in zero or common bias position. In FIG. 4 where the selector knob 46 is shown in partial arc position, the gain resistors 31–34 are in high gain position and the full bias voltages from voltage dividers 40–42 are applied to amplifiers 9. It is, of course, unnecessary to change the adjustment of voltage divider 39 since valve 1 is unbiased in either full-arc or partial arc.

The valve positions have been shown in FIGS. 3 and 4 as they would appear at approximately ¼ load. In FIG. 3, the valves are all open the same amount to produce approximately ¼ steam flow, whereas when knob 46 is positioned as in FIG. 4, valves 2, 3 and 4 will close as their respective biases are applied, while valve 1 will open due to the increase in gain. That is, valve 1 will open approximately four times as much as previously for the same value of the common valve positioning signal. Therefore, it is unnecessary to readjust the called-for load or valve positioning signal after the transfer has been made. The load is substantially the same before and after transfer and changes little during the transfer.

Operation of the invention may be seen by a review of the graphs in FIG. 5 which are somewhat idealized in order to simplify the explanation. The graphs show a four valve system and assume linear variations of valve position with valve signal. In the left-hand column are shown the characteristics for valves 1, 2, 3, 4 indicating that each valve will open in sequence as the valve positioning signal (abscissa) is progressively increased from left to right. The right-hand column indicates full arc operation, wherein it will be observed that since there is a common (grounded) bias signal, all valves will open simultaneously, but ¼ as much as before because of the reduced gain. The middle column assumes linear reduction rates of both gain and bias and shows the situation halfway through transfer. It will be observed that the gain in full arc is reduced by a factor equal to the reciprocal of the number of valves.

Taking, for example, a transfer from partial arc to full arc at 50% load, in the left-hand column at 50% load, valves 1 and 2 are wide open and valves 3 and 4 shut. Halfway through the transfer, valve 1 would still be wide open; valve 2 would have closed to the ¾ open position; valve 3 would have opened to the ½ open position, and valve 4 would have opened to the ¼ open position.

At the end of the transfer, all valves would be in the ½ open position. If nonlinearities were neglected, the steam flow would remain constant and the load constant throughout the transfer. Variations occur due to throttling losses and other variables. These can be compensated for in a particular system, however, by employing specially wound resistors for the gain resistor and bias voltage divider elements of FIGS. 3 and 4, or in some cases providing fixed voltage taps to introduce discontinuities where needed. All these adjustments depend on the particular system in question and will be apparent to those skilled in the art.

Other variations are possible which include more complicated circuit arrangements producing a more linear variation of gain with movement of the slide. However, the hyperbolic variation provided by the arrangement shown is perfectly satisfactory.

Thus, there has been described a means to smoothly transfer between full arc and partial arc at any desired load without substantial load change by merely turning the selector knob to move the ganged adjustable resistance taps. The transfer can be accomplished at any rate desired by the operator. During the transfer, some of the valves will be closing and some of the valves will be opening. However, by the present invention, the movement is coordinated so that disturbances to the turbine are held to a minimum.

While there is shown what is considered at present to be the preferred embodiment of the invention, it is of course understood that various other modifications may be made therein, and it is intended to cover in the appended claims all such modifications as fall within the true spirit and scope of the invention.

What we claim as new and desire to secure by Letters Patent of the United States is:

1. In a steam turbine control system having a plurality of valves connected to a source of steam and each supplying steam to a circumferentially spaced nozzle arc inside the turbine casing, said valves being positioned by individual electrohydraulic amplifiers in response to a common electrical valve positioning signal, the combination of:
   first means for varying the respective gains of said electrohydraulic amplifiers,
   second means for supplying different biasing signals to said electrohydraulic amplifiers so that the valves will operate in sequence, and
   transfer means arranged to simultaneously vary the gains and biases of the first and second means.

2. The combination according to claim 1, wherein said first means comprises a variable resistance connected in circuit relationship with the input of each of said electrohydraulic amplifiers, wherein said second means comprises an adjustable voltage divider and an adjustable biasing source effective to impede valve opening connected together in circuit relationship with each of said amplifiers, and wherein said transfer means comprises a common actuator connected to the slide arms of said resistances and voltage dividers.

3. The combination according to claim 1, wherein said transfer means is arranged to reduce the biasing signals supplied by said second means to a common level, whereby said valves will operate in parallel rather than in sequence and wherein the transfer means is also arranged to simultaneously reduce the gains by a factor which is substantially equal to the reciprocal of the number of said valves.

4. In a steam turbine control system having a plurality of valves connected to a source of steam and each supplying steam to a circumferentially spaced nozzle arc inside the turbine casing, said valves being positioned by individual electrohydraulic amplifiers, the combination of:
   means supplying a common DC electrical valve positioning signal to each of said electrohydraulic amplifiers,
   a gain adjusting variable resistance connected in circuit with each of the electrohydraulic amplifiers to vary the gain thereof;
   a source of DC electrical biasing voltage of opposite polarity to said valve positioning signal,
   a plurality of bias selecting means connected to said biasing source and operative to supply a selected different biasing voltage for each of said electrohydraulic amplifiers, whereby they can operate the valves in sequence,
   an adjustable voltage divider connected in circuit with each of said bias selecting means and providing an input to the electrohydraulic amplifier which is adjustable between a common voltage level and the respective biasing voltage, and
   a transfer mechanism connected to actuate said variable resistances and all but one of said adjustable voltage dividers so as to simultaneously lower the gains and to reduce the bias voltages to said common voltage level for full arc operation or to simultaneously increase the gain and apply said biasing voltages for partial arc operation of the turbine.

5. In a steam turbine control system having a plurality of valves connected to a source of steam and each supplying steam to circumferentially spaced nozzle arcs inside the turbine casing,
   a plurality of electrohydraulic amplifiers each operating one of said valves in response to a common electrical valve positioning signal,
   means for supplying selected biasing signals to said electrohydraulic amplifiers so that they will operate the valves in sequence as the valve positioning signal is increased or decreased, and
   a plurality of ganged variable impedance devices connected in circuit with said electrohydraulic amplifiers arranged to simultaneously vary the amplifier gains and to vary said biasing signals between a low gain common bias position and a high gain selected bias position while maintaining substantially constant steam flow to the turbine.

References Cited
UNITED STATES PATENTS

| | | | |
|---|---|---|---|
| 3,026,889 | 3/1962 | Bryant | 137—8 |
| 3,097,488 | 7/1963 | Eggenberger et al. | 60—73 |
| 3,097,489 | 7/1963 | Eggenberger et al. | 60—73 |
| 3,097,490 | 7/1963 | Callan et al. | 60—73 |
| 3,226,932 | 1/1966 | Strohmeyer | 60—73 |
| 3,241,322 | 3/1966 | Strohmeyer | 60—73 |
| 3,288,160 | 11/1966 | Eggenberger et al. | 137—27 |

EVERETTE A. POWELL, JR., *Primary Examiner.*